UNITED STATES PATENT OFFICE.

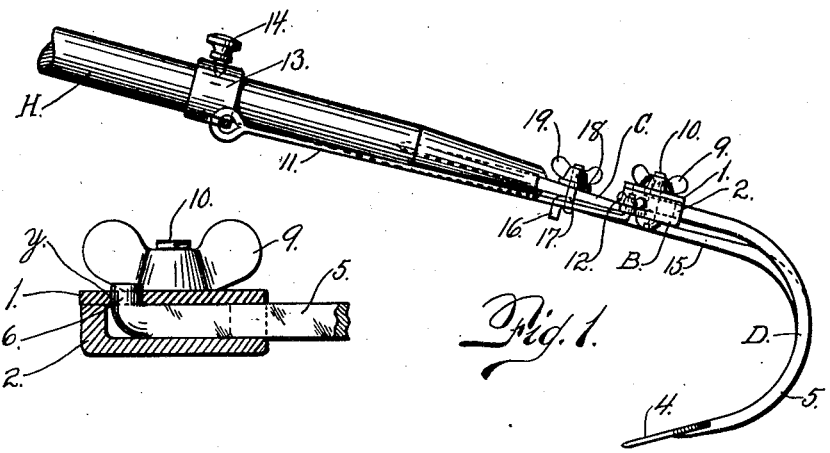
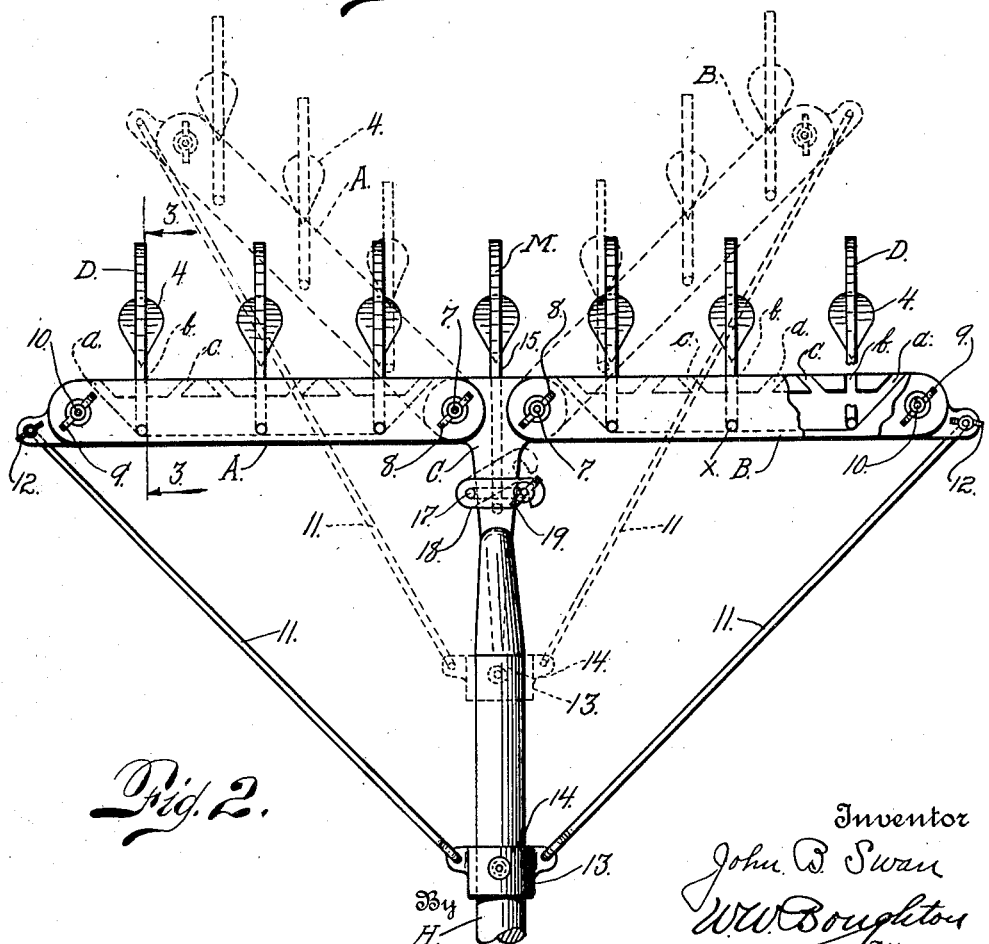

JOHN B. SWAN, OF DENVER, COLORADO.

HAND-CULTIVATOR.

1,272,567.      Specification of Letters Patent.      Patented July 16, 1918.

Application filed September 4, 1917. Serial No. 189,481.

*To all whom it may concern:*

Be it known that I, JOHN B. SWAN, a citizen of the United States, and a resident of the city and county of Denver, State of Colorado, have invented a certain new and useful Improvement in Hand-Cultivators, of which the following is a full, clear, and exact description.

My invention is an improvement in hand operated cultivators and has for its object the provision of a simple, durable and inexpensive device of the character described which shall be readily adjustable into a number of different positions for performing a number of different functions or operations.

Among these different adjustments are ones to turn the soil either toward or away from a row when the row is being straddled by the tool; other for the same actions when the tool is used between the rows; to merely work the soil (without throwing it one way or another) as when preparing for seeding; and to shorten the effective length of the device while still turning the soil all in one direction. Further and more particular objects and advantages of my invention will later appear from this specification.

In the single sheet of drawings accompanying this application and forming a part hereof Figure 1 is a side view of my device, the handle employed therewith being broken away to shorten the figure;

Fig. 2 is a plan view of my device, portions being broken away to show interior structure and to shorten the figure, this figure showing the cultivator in one adjustment in full lines and in another in dotted lines; and Fig. 3 is a transverse sectional detail, on an enlarged scale, taken on the line 3—3 of Fig. 2.

Referring to the drawings, in which like characters of reference designate like parts in the several views, let H indicate a handle which is preferably substantially of the length of a rake handle, and C a head secured to the lower end of the handle in any suitable manner. This head is preferably a T-shaped plate, the arms of the T being rounded on their outer ends and provided near their extremities with pivot holes. Arms A and B are pivoted at their inner ends in the holes in the head C and these arms carry cultivator teeth D.

Each of these arms is composed of an upper plate 1 and a lower plate 2. In the preferred form shown in the drawings the upper plate 1 is merely a plain cover plate and the lower plate 2 is provided with a plurality of grooves $a$, $b$ and $c$; these grooves all radiate from a center $x$, those indicated by $a$, inclining toward the ends of the arms, $b$, being at right angles to the longer dimensions or axes of the arms and $c$ inclining toward the inner ends of the arms—when considered in a direction away from the centers $x$. The top plates 1 are provided with a number of round holes $y$ above the centers $x$.

The cultivator teeth D consist of a blade 4 and a shank 5 curved as shown and ending at the upper end in a right angled, vertical portion 6 which is round in shape and rotatably fits in the holes $y$ in the plate 1, projecting a slight distance therethrough as indicated in Fig. 3. The shanks 5 of the cultivator teeth are adapted to be received and held in any one of the grooves $a$, $b$ or $c$ and to be retained therein by the top plate 1 which closes the tops of the grooves.

At their inner ends the arms A and B are pivoted to the head C by means of bolts 7, the plate 2 being suitably recessed to receive the ears of the T-shaped head C between the bottom of plate 2 and plate 1. Thumb nuts 8 hold the bolts 7 in position but form a convenient means of releasing the same when an adjustment is desired. Similar nuts 9 on bolts 10 serve to hold the arm plates together at their outer ends.

Braces 11 extend to the outer ends of the arms A, B, to which they are removably secured by thumb nuts 12. The upper ends of the braces 11 are secured to a collar 13 slidably mounted on the handle H and adapted to be held in position by the set screw 14.

The device as so far described provides a construction adapted to straddle a row of growing plants. If such action is not desired an additional cultivator tooth M may be added. This tooth is shaped substantially like the remaining teeth except that its shank 15 has a slightly different curvature to make its blade stand in substantially the same relation as the other blades, and its upper end bends down at 16 (instead of up as in the case of the other teeth). This tooth is adapted to be removably held in place by a U-bolt 17, swiveled at one extremity in a clamping plate 18 and provided at its other end with threads on which a thumb nut 19 may be screwed to draw the same into engagement with the clamping plate 18. When so drawn the lower curved portion of the U bolt (which encircles the shank 15 just below the down turned end 16) will draw the shank 15 of the extra tooth M tightly against the head C and hold the same in place.

*Operation.*

When the tooth M is not employed the device is adapted to straddle the row of plants to be cultivated. If, now, the arms are in the position shown in full lines in Fig. 2 and with the shanks 5 of the teeth D in the grooves *b*, the tool will not operate to throw the soil more in one direction than another. If it be desired to work the soil away from the rows of plants (as, for instance, when irrigation is to be carried out) the thumb nuts 8 are loosened a trifle and the collar 13 is slipped down to the dotted line position shown in Fig. 1 and there locked by the set screw 14. Then the nut 9 is also slightly loosened, thus freeing the upper arm plate 1 sufficiently to enable the cultivator teeth shanks 5 to be moved into the slots *a* and, when the nuts 8 and 9 are tightened, the teeth D will stand as shown in dotted lines in Fig. 2. On the other hand if the intention is to cultivate toward the rows, the collar 13 will be moved above its full line position in Fig. 2 a corresponding distance and the teeth shanks 5 will be moved into the grooves *c*.

The use and adjustments of the tool between the rows will be the reverse of that described above in connection with its use when straddling a row. Furthermore in this use the tooth M (which is stationary and therefore always in a plane parallel with the handle H) will be added to fill the space normally left between the adjacent inner teeth D. To shorten the tool and still have it throw the soil all in one direction, the arms are set in a diagonal straight line. This is effected by freeing one of the braces 11 by removing its nut 12 and turning that arm (for instance B) into the dotted line position of Fig. 2, where it will be held from further turning by engagement of the ear on the T-shaped head C with the wall of the ear receiving recess in its plate 2. The other arm A is then moved into line with arm B by slipping the collar 13 upward on the handle H and locking the same in position. The cultivator teeth D on the arm A are then moved into grooves *c* while those on B are placed in grooves *a*.

Having thus described my invention, what I claim and desire to secure by Letters Patent is:—

1. In a cultivator, a handle, a pair of arms pivotally mounted at the inner ends thereof on one end of said handle, each arm being composed of a pair of separable plates having a plurality of diverting grooves in their engaging faces, and a plurality of cultivator teeth carried by each arm, the shank of each tooth being receivable in a plurality of said grooves, whereby the angularity of said tooth may be adjusted with relation to its arm.

2. In a cultivator, a handle, a pair of arms pivotally mounted at the inner ends thereof on one end of said handle, each arm being composed of a pair of separable plates, the upper of said plates having a plurality of tooth shank receiving holes and the lower of said plates having a plurality of tooth shank receiving grooves so placed as to diverge from the center of each of said holes, and a cultivator tooth having a shank with an upwardly turned end received in each of said holes.

3. In a cultivator, a handle, a pair of arms pivotally mounted at the inner ends thereof on one end of said handle, each arm being composed of a pair of separable plates, the upper of said plates having a plurality of tooth shank receiving holes and the lower of said plates having a plurality of tooth shank receiving grooves so placed as to diverge from the center of each of said holes, a cultivator tooth having a shank with an upwardly turned end received in each of said holes, and releasable means for securing said plates together.

4. In a cultivator, a handle, a pair of arms pivotally mounted at the inner ends therof on one end of said handle, each arm being composed of a pair of separable plates, the upper of said plates having a plurality of tooth shank receiving holes and the lower of said plates having three tooth shank receiving grooves so placed as to diverge from the center of each of said holes, the one of said grooves being at right angles to the axis of its arm and the other two grooves being disposed on opposite sides of the first mentioned groove and forming acute angles with said axis; a cultivator tooth having a shank with an upwardly turned end received in each of said holes, and releasable means for securing said plates together.

5. In a cultivator, a handle, a collar slidably mounted on said handle, a pair of arms pivotally mounted at the inner ends thereof on one end of said handle, braces connecting said collar with the outer ends of said arms, means for holding said collar in adjusted position, and cultivator teeth carried by said arms.

6. In a cultivator, a handle, a pair of arms pivotally mounted at the inner ends thereof on one end of said handle, braces connecting said collar with the outer ends of said arms, means for holding said collar in adjusted position, and cultivator teeth carried by said arms, said teeth being so mounted that they may be adjusted with relation to their supporting arms.

7. In a cultivator, a handle, a pair of arms pivotally mounted at the inner ends thereof on one end of said handle, each arm being composed of a pair of separable plates having a plurality of diverging grooves in their engaging faces, a plurality of cultivator teeth carried by each arm, the shank of each tooth being receivable in a plurality of said grooves, whereby the angularity of said tooth may be adjusted with relation to its arm, a collar slidably mounted on said handle, braces connecting said collar with the outer ends of said arms, and means for holding said collar in adjusted position.

8. In a cultivator, a handle, a pair of arms pivotally mounted at the inner ends thereof on one end of said handle, means for holding said arms at different angles to the handle, cultivator teeth carried by the arms, said teeth being so mounted that they may be adjusted angularly with relation to their supporting arms, and an extra tooth removably mounted on the end of said handle.

In testimony whereof, I have hereunto affixed my signature.

JOHN B. SWAN.